Figure 1:
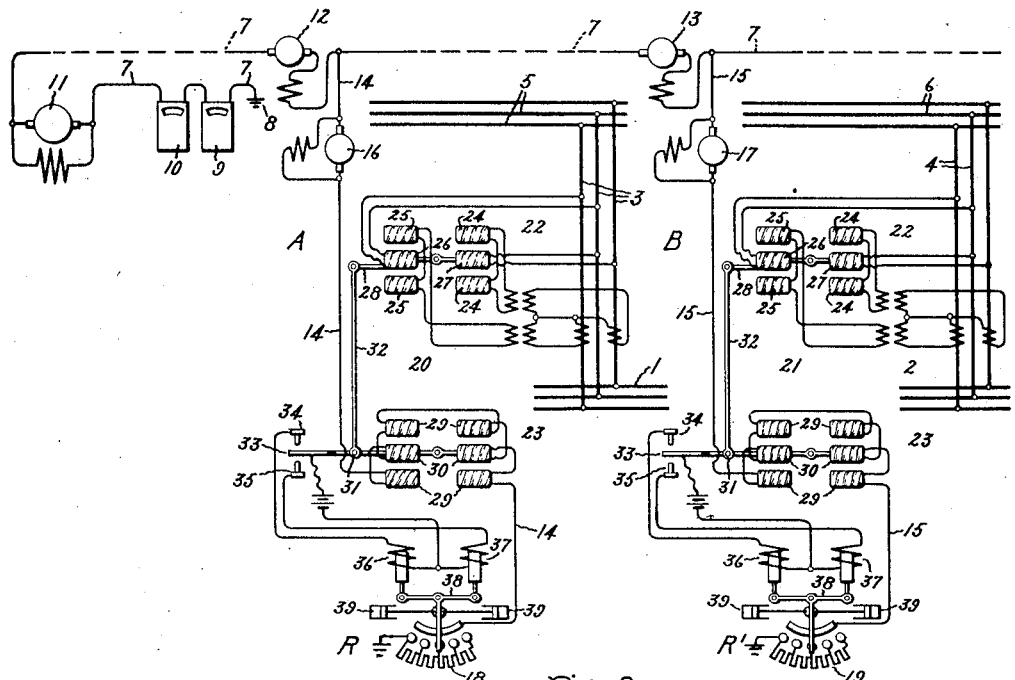

L. WILSON.
TOTALIZING POWER SYSTEM.
APPLICATION FILED APR. 20, 1918.

1,352,235.

Patented Sept. 7, 1920.
4 SHEETS—SHEET 1.

Inventor:
Leonard Wilson,
by Albert G. Davis
His Attorney

L. WILSON.
TOTALIZING POWER SYSTEM.
APPLICATION FILED APR. 20, 1918.

1,352,235.

Patented Sept. 7, 1920.
4 SHEETS—SHEET 2.

Inventor:
Leonard Wilson,
by *Albert G. Davis*
His Attorney.

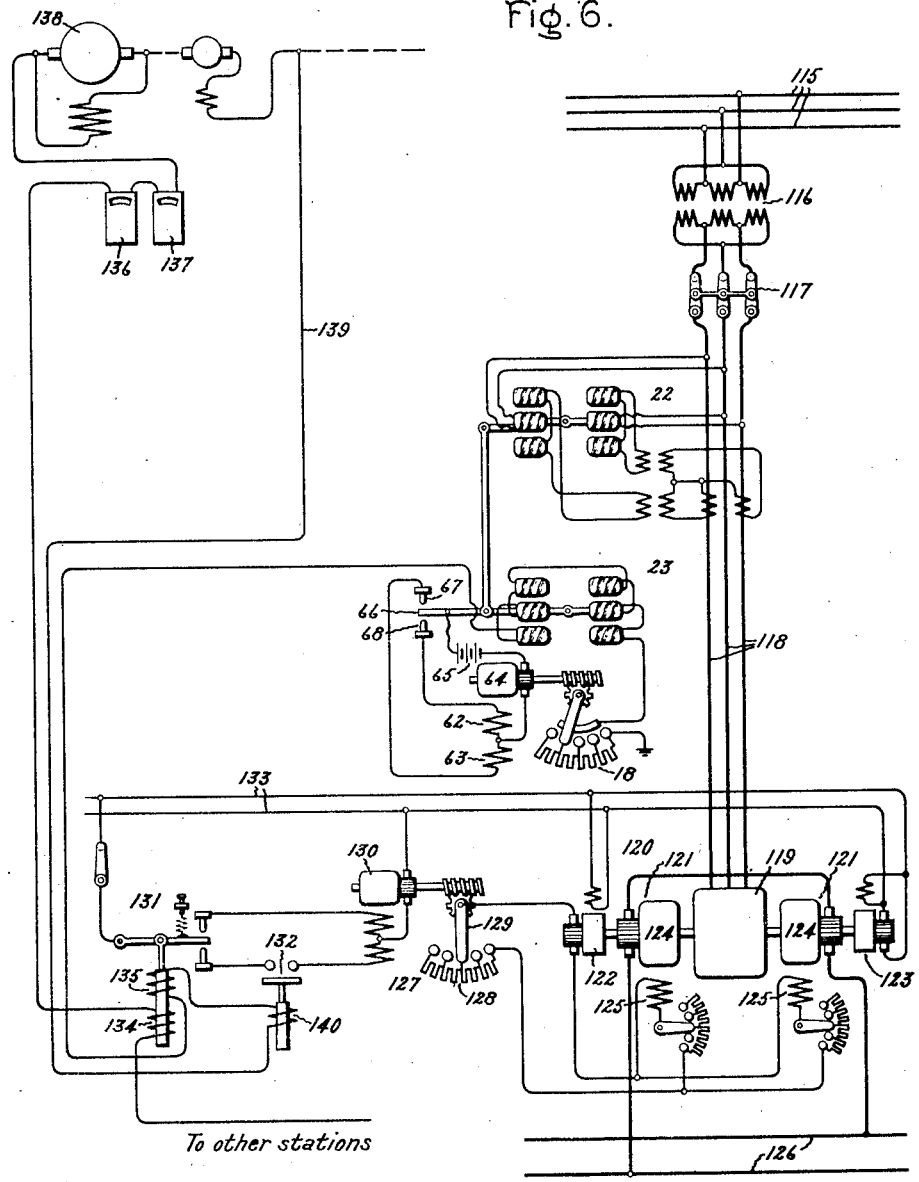

UNITED STATES PATENT OFFICE.

LEONARD WILSON, OF SALT LAKE CITY, UTAH, ASSIGNOR TO GENERAL ELECTRIC COMPANY, A CORPORATION OF NEW YORK.

TOTALIZING POWER SYSTEM.

1,352,235.  Specification of Letters Patent.  Patented Sept. 7, 1920.

Application filed April 20, 1918. Serial No. 229,732.

*To all whom it may concern:*

Be it known that I, LEONARD WILSON, a citizen of the United States, residing at Salt Lake City, in the county of Salt Lake, State of Utah, have invented certain new and useful Improvements in Totalizing Power Systems, of which the following is a specification.

My invention relates to totalizing power systems and particularly to totalizing power systems wherein the current traversing a pilot circuit is varied in a definite relation to the total power supplied, at a plurality of places, to one or more distribution circuits by one or more sources of power, and the object of my invention is to provide a new and improved system of this kind.

In distribution systems having considerable length, or covering considerable area, it is common to supply power to the system at widely separated places either from the same or different sources. For many purposes it is desirable to have available at one, or more, places a quantity which varies as the total power supplied to the one or more distribution systems at said widely separated places. To totalize the power by conveying it through a single station is generally impractical. In the copending application of John B. Taylor, Serial No. 868,901, filed October 27, 1914, Patent No. 1,260,094, granted March 19, 1918, is described and claimed a totalizing power system comprising a pilot circuit common to all the places, or substations, at which power is supplied to a distribution circuit, a constant voltage source of current connected to the pilot circuit, variable resistances serially connected in the pilot circuit at the respective substations and power responsive means for adjusting the resistances in a definite relation to the power supplied at the respective stations. According to this system the current flowing in the pilot circuit is caused to bear a definite relation to the total power supplied and hence constitutes a quantity which varies with the total power and is available at any place to which the pilot circuit may be extended.

In accordance with my invention I totalize the power supplied at a plurality of places or stations, by means of a system comprising a circuit, having a plurality of parallel portions, which are associated with the respective places at which power is supplied to the distribution system or systems, and a main portion, which may be extended to any place at which it is desired to have a quantity, or current, which varies with the total power, means for supplying current to said circuit, and means for varying the current traversing said parallel portions in a definite relation to the power supplied at the stations with which the respective parallel portions are associated. The current traversing the main portion of the circuit, being equal to the sum of the currents traversing the parallel portions, therefore constitutes a quantity which varies in a definite relation to the total power supplied at all of the places or stations.

Figure 2:
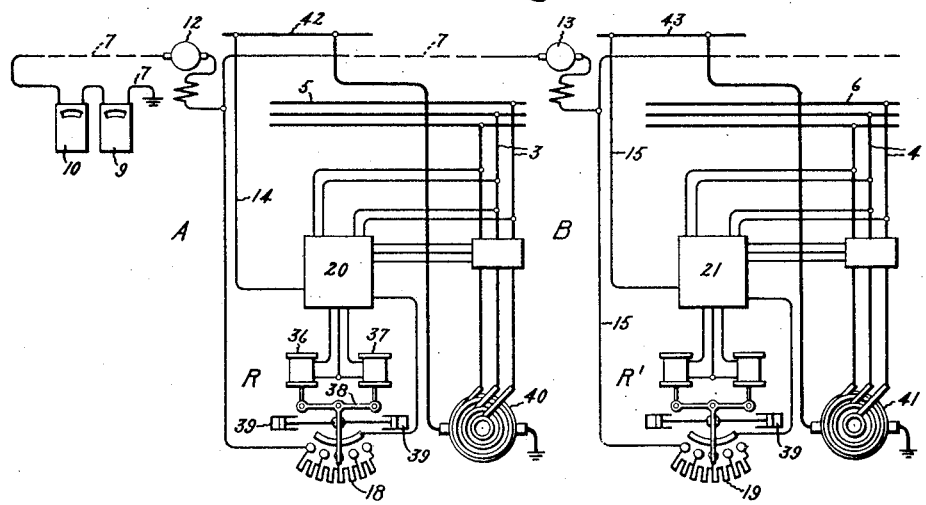
Figure 3:
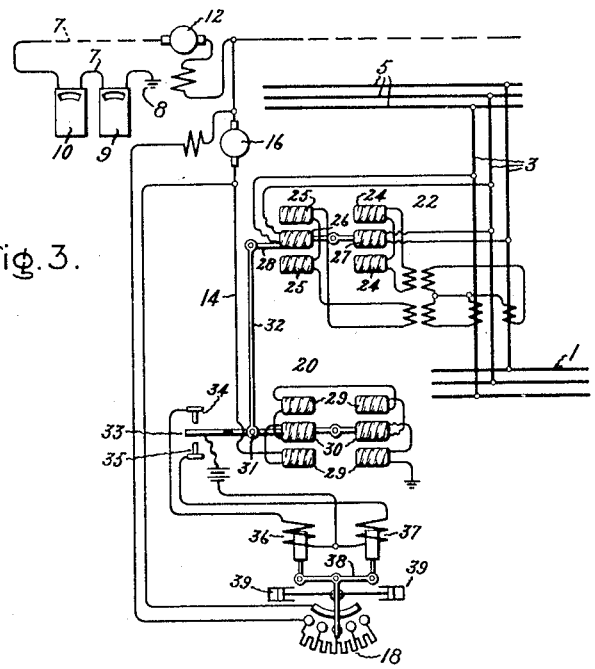
Figure 4:
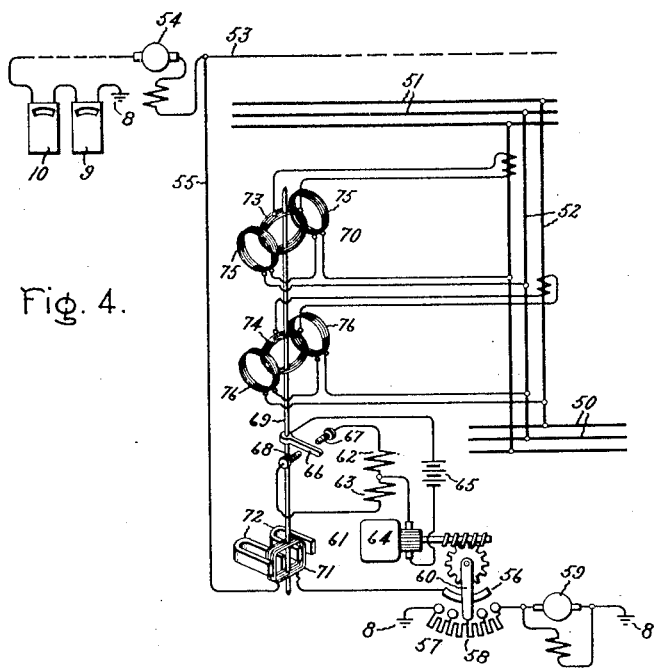
Figure 5:
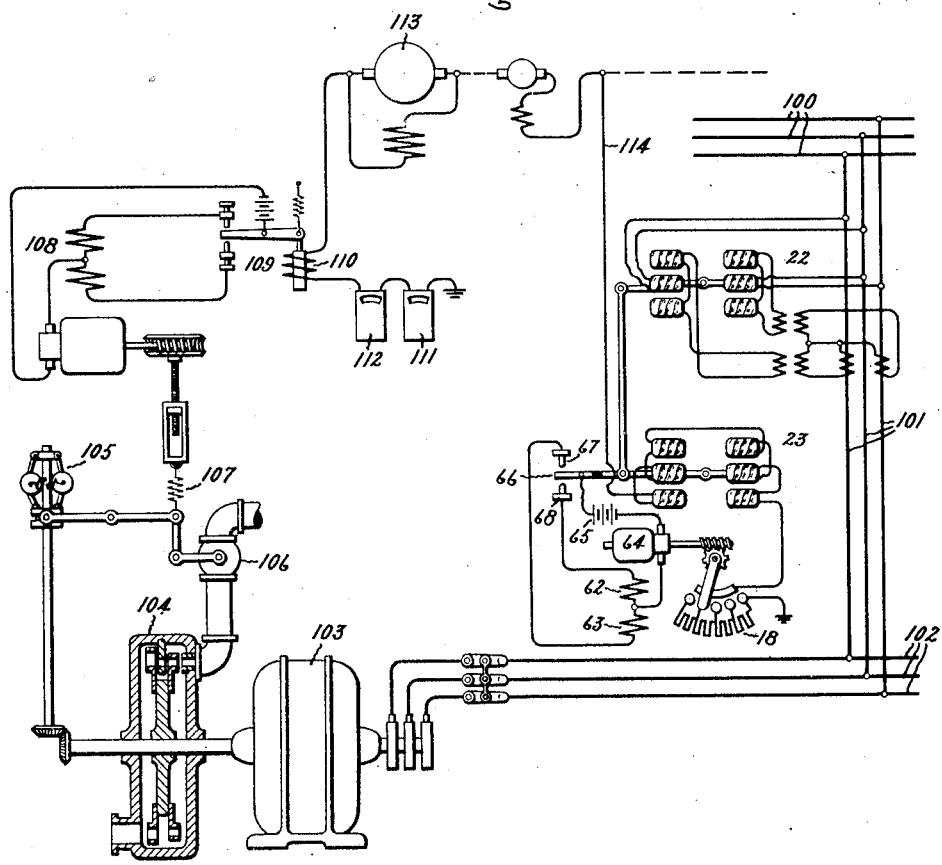

For a more complete explanation of my invention reference should be made to the following description and the accompanying drawings in which: Figure 1 is a diagrammatic view of one modification of my invention applied to a system comprising two stations at which power is supplied to one or more distribution systems; Fig. 2 is a diagrammatic view of a second modification of my invention applied to a system comprising two stations at which the power, supplied to one or more distribution systems is transformed from alternating current power to direct current power; Fig. 3 is a diagrammatic view of a third modification of my invention showing the equipment of a single station only; Fig. 4 is a diagrammatic view of a fourth modification showing the equipment of a single station only; Fig. 5 is a diagrammatic view of a system comprising a supplemental generating set, in which my invention is employed both to measure the power supplied to a distribution system by one or more main sources of power and to limit the power supplied by said main sources of power to a desired maximum value, by controlling the operation of said supplemental generating set, the equipment at one of the stations at which power is supplied to the distribution system alone being illustrated; and Fig. 6 is a diagrammatic view of a system, in which rotary transformers are interposed between one or more main sources of power and a distribution system and in which my invention is employed both to measure the power transformed and to limit the power transformed to a desired maximum value, the equipment at one of the stations at which power is supplied to the distribution system alone being illustrated.

Referring to Fig. 1, A and B represent stations at which distribution circuits 1 and 2 are respectively connected, by means of the conductors 3 and 4, to the supply mains 5 and 6. The distribution circuits 1 and 2 may constitute a single distribution system or independent distribution systems and the supply mains 5 and 6 are adapted to be supplied with electrical power from a single source or from independent sources, not illustrated. A conductor 7 extends from ground 8, through the indicating ammeter 9, integrating ammeter 10 and generator 11 to stations A and B. If desired series boosters 12 and 13 may be inserted at suitable places in said conductor. Conductors 14 and 15, connected in parallel between the conductor 7 and ground 8, are associated with the respective stations A and B. In conductors 14 and 15 are inserted generators 16 and 17 and variable resistances 18 and 19 which are adapted to be controlled by means of similar contact making devices 20 and 21, located at stations A and B respectively. Said contact making devices each comprise a pair of Kelvin balances 22 and 23. The balance 22, of contact making device 20, comprises stationary current coils 24, 25 and movable voltage coils 26, 27, which are associated with the conductors 3 in such a way that the movable coils tend to rotate the member 28, to which they are secured, with a torque which bears a definite relation to the power supplied to the distribution circuit 1 through the conductors 3. The balance 23 comprises stationary current coils 29 and movable current coils 30, which are connected in the conductor 14 in such a way that the movable coils 30 tend to rotate the members 31, to which they are secured, with a torque which bears a definite relation to the current in the conductor 14. The members 28 and 31 are connected by means of a link 32. The torque tending to rotate members 28, due to the power supplied to the distribution circuit 1, is opposed by the torque tending to rotate member 31, due to the current traversing the conductor 14. The member 31 carries a movable contact 33 which is adapted to coöperate with the stationary contacts 34 and 35 to control the energization of windings 36 and 37, of the power operated rheostat R, which in turn effect the movement of the contact member 38 to vary the resistance 18. Dash pots 39 may be employed to prevent sudden and extreme movements of the member 38. If desired permanent magnets may be substituted for the stationary coils 29 of the Kelvin balance 23.

The contact making device 21 and power operated rheostat R', at station B, are constructed and connected in the same way as the contact making device 20 and power operated rheostat R at station A.

The operation of the system, illustrated in Fig. 1, is as follows: First let it be assumed that the amount of power being supplied by the supply mains 5 to the distribution circuit 1 at station A bears such relation to the current in conductor 14 that the torque of the balance 22 is just balanced by the torque of the balance 23. The movable contact 33 will then be out of engagement with stationary contacts 34 and 35, as illustrated. Now, assume that the amount of power being supplied by the supply mains 5 to the distribution circuit 1 increases. The torque of the balance 22 will then be greater than the opposing torque of the balance 23 and the movable contact 33 will be moved into engagement with the stationary contact 34, whereupon the winding 36 will be energized and the contact member 38 will be moved in a clockwise direction to decrease the resistance in the conductor 14 and hence to increase the current therein. While the movable contact 33 remains in contact with the stationary contact 34, the resistance of the conductor 14 will be gradually decreased until the current in the conductor 14 becomes sufficient to cause the torque of the balance 23 to balance the torque of the balance 22 and hence to disengage the movable contact 33 from the stationary contact 34. Similarly if the power being supplied by the supply mains 5 to the distribution circuit 1 be decreased, the current in the conductor 14 will be correspondingly decreased. It is thus apparent that, as the amount of power being supplied by the supply mains 5 to the distribution circuit 1 varies, the current in the conductor 14 will be caused to vary in a definite relation thereto and hence the value of this current represents the amount of power being supplied at station A.

The equipment at station B operates in the same manner as that at station A so that the value of the current flowing in the conductor 15 represents the amount of power being supplied by the supply mains 6 to the distribution circuit 2 at station B. Since the currents traversing the parallel conductors 14 and 15, also traverse that portion of the conductor 7, which extends from station A through generator 11 to ground, the value of the current traversing this portion of the conductor 7 represents the total power supplied at the stations A and B to the distribution circuits 1 and 2. This portion of the conductor 7 may also be considered the main portion of a circuit of which parallel conductors 14 and 15 are parallel portions.

Although it is desirable, when the stations A and B are widely separated, to employ the series boosters 12 and 13, in order to compensate for ohmic drop, thereby maintaining the voltage across the parallel conductors or circuit portions approximately uniform, and hence to reduce the necessary range of adjustment of the resistances in the conductors 14 and 15, nevertheless where the ohmic drop is inconsiderable the boosters 12 and 13 may be dispensed with. Likewise ordinarily either the generators 11 or generators 16 and 17 may be omitted. It is also evident that batteries, or other sources of current, may be substituted for the generator 11 and the generators 16 and 17.

In Fig. 2 a second modification of my invention embodied in a system in which rotary transformers are interposed, at the stations A and B, between alternating current supply mains and direct current distribution circuits, is illustrated. In so far as the elements of the system shown in Fig. 2 are identical with the elements shown in the system of Fig. 1, the same reference characters are employed. Detailed description of the elements which are common to the two systems has already been made in connection with Fig. 1. In the system shown in this figure power is supplied at the stations A and B by the supply mains 5 and 6, through the conductors 3 and 4, to the rotary transformers 40 and 41, the direct current sides of which are electrically connected between the positive busses 42 and 43 and ground. The contact making devices 20 and 21 are connected to the conductors 14 and 15 and to the conductors 3 and 4 in the same manner as in the system shown in Fig. 1. In this system, however, the direct current in the conductors 14 and 15 is supplied from the busses 42 and 43 and, as in the system of Fig. 1, series boosters 12 and 13 may be connected in the conductor 7.

The system shown in Fig. 2 operates in substantially the same way as the system shown in Fig. 1 and, since the operation of the latter system has already been fully explained, further explanation of the operation of the system shown in Fig. 2 appears to be unnecessary.

In Fig. 3 a third modification of my invention is illustrated and in this figure the equipment of only a single station is illustrated. Elements which are identical with elements illustrated in Fig. 1 are designated by the same reference characters, and detailed description thereof is therefore deemed unnecessary, as such description appears in connection with the system of Fig. 1. The station equipment, illustrated in Fig. 3 differs from that of station A, illustrated in Fig. 1, merely in that the resistance 18 is removed from the conductor 14 and inserted in series with the field of the generator 16. The current in the conductor 14 is then automatically varied by varying the voltage of the generator 16 through the adjustment of the resistance 18 so that the current bears a definite relation to the power transferred. Any number of stations may be connected in the manner indicated in Fig. 1.

Fig. 4 illustrates a fourth modification of my invention and shows the equipment for only a single station. In this modification the distribution circuit 50 is supplied with power from the supply mains 51 through the conductors 52. A conductor 53 extends from ground 8 through the indicating ammeter 9 and the integrating ammeter 10 to the station illustrated and may be continued to other stations, not shown. If desired one or more series boosters 54 may be inserted in the conductor 53. A conductor 55 extends between the conductor 53 and the stationary contact 56 of the variable resistance device 57. One of the terminals of the resistance 58 of said device is connected directly to ground 8 and the other is connected to ground 8 through the generator 59. The point on the resistance 58 to which the contact 56 is connected is varied by means of the arm 60 which is adapted to be rotated in one direction or the other by means of the reversible motor 61, comprising the field windings 62 and 63 and the armature 64. A source of current 65 is employed for energizing said motor. The direction of rotation of said motor is controlled by means of the movable contact 66 and the stationary contacts 67 and 68. When the movable contact 66 is in engagement with the stationary contact 67 a circuit is completed through the armature 64 and the field 62, whereupon the motor will be rotated in one direction, and when the movable contact 66 is in engagement with the stationary contact 68 a circuit will be completed through the armature 64 and field 63 and the motor will be rotated in the oposite direction. The movable contact 66 is secured to a spindle 69 of a contact making device 70. This contact making device is similar in its function and operation to the contact making device 20 illustrated in Fig. 1. A current coil 71 in series with the conductor 55 is secured to the spindle 69, near its lower end, and is adapted to coöperate with the permanent magnets 72. To said spindle 69 are also secured current coils 73 and 74 which coöperate with stationary voltage coils 75 and 76 respectively. The current coils 73 and 74 and the voltage coils 75 and 76 are associated with the conductors 52 in such a way that the movable coils tend to rotate the spindle 69 with a torque which bears a definite relation to the power supplied to the distribution circuit 50 through the conductors 52. The movable coil 71 is arranged in such a way with respect to the permanent magnets 72 that it tends to rotate the spindle 69 with a torque, which bears a definite relation to the current in the conductor 55. The torque exerted upon the spindle 69 by coils 73 and 75 opposes that exerted by coil 71.

The operation of the contact making device 70, in its control of the movable contact 66, is substantially the same as the operation of the contact making device 21 in its control of contact 33, which has already been explained in connection with Fig. 1. If the current in the conductor 55 be insufficient to cause the torque exerted by coil 71 to balance the torque exerted by coils 73 and 74, movable contact 66 will engage with stationary contact 67 and cause the motor to rotate the arm 60 in a counter-clockwise direction, thereby connecting the contact 56 to a point of higher voltage and increasing the current in the conductor 55. On the other hand, if the power supplied by the supply mains 51 to the distribution circuit 50, and hence the torque exerted by the coils 75 and 76, decrease, the movable contact 66 will be caused to engage with stationary contact 68 and cause the motor to rotate the arm 60 in a clockwise direction, thereby connecting the contact 56 to a point of lower voltage and decreasing the current in the conductor 55. Thus the current in the conductor 55 is automatically adjusted so that it bears a definite relation to the power supplied through conductors 52. Any number of stations may be connected in the manner indicated in Fig. 1.

In the system illustrated in Fig. 5, the conductors 100 lead from a main source of power and are connected by means of the conductors 101 to the distribution system 102, which is adapted to be connected to the slip rings of a generator 103. The generator 103 is adapted to be driven by a prime mover 104, which is provided with a governor 105 which controls the admission of motive fluid thereto through the valve 106. The operation of the governor 105 is under the control of the spring 107, the tension of which is adapted to be adjusted by the rotation of the reversible motor 108, the direction of rotation of which is controlled by the contact making ammeter 109. The contact making ammeter 109 is provided with a current responsive winding 110 which, together with the integrating and indicating ammeters 111 and 112 and the generator 113, are serially connected in the main portion of a circuit, which has parallel portions 114 associated with the respective stations at which power is transferred to the distribution system. At each station are located means for varying the current in the parallel portions 114, associated therewith, in accordance with the power transferred through said station to the distribution system. This means is substantially like that illustrated in Fig. 1, with the exception that a motor operated rheostat of the kind illustrated in Fig. 4 is substituted for the motor operated rheostat illustrated in Fig. 1.

As already explained in connection with Fig. 1, the main portion of the circuit in which the winding 110 of the contact making ammeter 109 is located, is traversed by current equal to the sum of the currents traversing the parallel portions 114, so that the current traversing the winding 110 varies in accordance with the total power supplied, at all stations, to the distribution system 102.

The contact making ammeter 109, spring 107, governor 105 and valve 106 are so arranged and adjusted that when the power supplied at all the stations to the distribution system is less than a desired predetermined maximum, the supplemental generating set will simply float on the distribution system 102 and will deliver no power thereto, but when the power supplied at all the stations to the distribution system tends to exceed said desired predetermined maximum, the supplemental generating set will be caused to speed up and deliver power to the distribution system so as to prevent the power supplied thereto, from the main source of power, exceeding said desired maximum value.

In the system, illustrated in Fig. 6, the conductors 115 lead from a main source of power and are connected through the transformer 116, switch 117 and conductors 118, to the motor 119 of the rotary transformer 120. Generators 121, an exciter 122 and a generator 123 are adapted to be driven by the motor 119. The generator 121 comprise armatures 124 and field windings 125. The armatures 124 are connected in series with each other to the distribution system 126. The armature of the exciter 122 is connected through the motor operated rheostat 127 to the field windings 125 of the generators 121. The motor operated rheostat 127 comprises the resistance 128, the controller arm 129 and the reversible motor 130 which is geared to the controller arm 129, the movement of which cuts resistance into, or out of circuit with the field windings 125. The direction of rotation of the reversible motor 129 is controlled by the contact making ammeter 131 and the relay 132. The reversible motor 130 is adapted to be connected, by the contact making ammeter 131, to the busses 133 which are supplied with current by the generator 123. The contact making ammeter 131 is provided with a plurality of windings 134 and 135. The winding 134, together with similar windings at other stations, the integrating and indicating ammeters 136 and 137, and the generator 138, are serially connected in the main portion of a circuit, which has parallel portions 139 associated with the respective stations at which power is supplied to the distribution system. The winding 135 and the operating winding 140, of the relay 131, are serially connected in the parallel portion 139 associated with the station with which said windings are associated. At each station are located means for varying the current in the parallel portion 139 associated therewith, in accordance with the power transformed and delivered at said station to the distribution system. This means is substantially like that illustrated in Fig. 5.

As already explained, in connection with Fig. 1, the main portion of the circuit, in which the winding 134 of the contact making ammeter 131 is located, is traversed by current equal to the sum of the currents traversing the parallel portions 139 associated with the respective stations, so that the current traversing the winding 134 varies in accordance with the total power supplied, at all the stations, to the distribution system 126, and the parallel portion 139, in which the winding 135 of the contact-making ammeter 131 and the operating winding 140 of the relay 132 are located, is traversed, and consequently the winding 135 and the operating winding 140 are traversed, by current which varies in accordance with the power supplied to the distribution system 126 at the station with which said parallel portion is associated.

The moving arm of the contact making ammeter 131 is normally held by the spring against the upper contact and is only drawn down, so as to engage the lower contact and thereby drive the motor 130 so as to increase the resistance in circuit with the field windings 125, when the combined effect of windings 134 and 135 is sufficient to overcome the action of said spring. Furthermore the motor can be driven in a direction to increase the resistance in circuit with the field windings 125 only when the relay 132 is closed.

Assume now that the power transformed at the station, with which the contact making ammeter 131 is associated, is less than a predetermined value, and the power transformed at all the stations is less than a predetermined value, the moving arm of the contact making ammeter 131 will then be in engagement with the upper contact and the motor 130 will have been rotated to cut all the resistance 128 out of circuit with the field windings 125. Now assume that the power transformed at the station with which the contact making ammeter 131 is associated increases to a value at which the relay 132 is caused to close and that the power transformed at all the stations rises to such a value that the combined effect of the winding 134 and of the winding 135 causes the moving arm of the contact making ammeter 131 to engage with the lower contact. The motor 130 will then be rotated in a direction to cut resistance 128 into the field windings 125 and thereby reduce the voltage of the generators 121 and hence reduce the power delivered by the rotary transformer 120 to the distribution system 126. The effect of the winding 135 of the contact making ammeter 131 and similar windings on contact making ammeters at stations, other than the one illustrated, is to cause the voltage of the rotary transformer at a more heavily loaded station to be decreased before the voltage of the rotary transformer at a more lightly loaded station is decreased. The effect of the relay 132, and similar relays at other stations, is to prevent the reduction of the voltage of the rotary transformers on which the load is below a predetermined value, notwithstanding the total power transformed at all the stations exceeds the desired maximum value.

The ammeters 9 and 10, shown in Figs. 1 to 4, the ammeters 111 and 112, shown in Fig. 5 and the ammeters 136 and 137, shown in Fig. 6, may, of course, be located at any convenient place at which the main portion of the circuit is available and, when properly calibrated, will measure the total power supplied at all of the stations to the distribution circuit or circuits.

I conceive that various modifications and applications of my invention, other than those illustrated, may be made, and accordingly I do not desire to be limited to the exact arrangement herein described and shown, but seek to cover in the appended claims all such modifications and arrangements as fall within the spirit and scope of my invention.

What I claim as new and desire to secure by Letters Patent of the United States, is:

1. A system for totalizing the power supplied at a plurality of stations, comprising a circuit having parallel portions, associated with the respective stations, and a main portion, individual sources of current connected to said parallel portions and means associated with the respective stations and controlled by the power supplied thereat for varying the magnitude of the current in said parallel portions so that it bears a definite relation to the magnitude of the power being supplied at the respective stations associated therewith.

2. A system for totalizing the power supplied at a plurality of stations, comprising a circuit having parallel portions, associated with the respective stations, and a main portion, means for energizing said circuit, means associated with the respective stations and controlled by the power supplied thereat for varying the magnitude of the current in said parallel portions so that it bears a definite relation to the magnitude of the power being supplied at the respective stations associated therewith, and means for maintaining the voltage across said parallel portions approximately uniform.

3. A system for totalizing the power supplied at a plurality of stations, comprising a circuit having parallel portions, associated with the respective stations, and a main portion, means for energizing said circuit, and means, controlled by the power supplied at the respective stations and by the current in said parallel portions associated therewith, for varying the current in said parallel portions in a definite relation to the power supplied at the respective stations.

4. A system totalizing the power supplied at a plurality of stations, comprising a circuit having parallel portions, associated with the respective stations, and a main portion, means for energizing said circuit, and means, comprising contact making devices responsive to the power supplied at the respective stations and to the current in said parallel portions associated therewith, for varying the current in said parallel portions in a definite relation to the power supplied at the respective stations.

5. A system for totalizing the power supplied at a plurality of stations, comprising a circuit having parallel portions, associated with the respective stations, and a main portion, means for energizing said circuit, and means, comprising contact making devices, responsive to the power supplied at the respective stations and to the current in the said parallel portions associated therewith, for varying the current in said main circuit portion in a definite relation to the power supplied at all of said stations.

6. The combination with a plurality of stations and a distribution system adapted to be supplied with power at said stations, of means, for totalizing the power supplied to said distribution system, comprising a circuit having parallel portions, associated with the respective stations, and a main portion, a source of current for said circuit, power operated rheostats for varying the current in said parallel portions, and contact making devices responsive both to the power supplied at the respective stations and to the current in said parallel portions for controlling the operation of said rheostats.

In witness whereof, I have hereunto set my hand this first day of April, 1918.

LEONARD WILSON.